UNITED STATES PATENT OFFICE 2,588,741

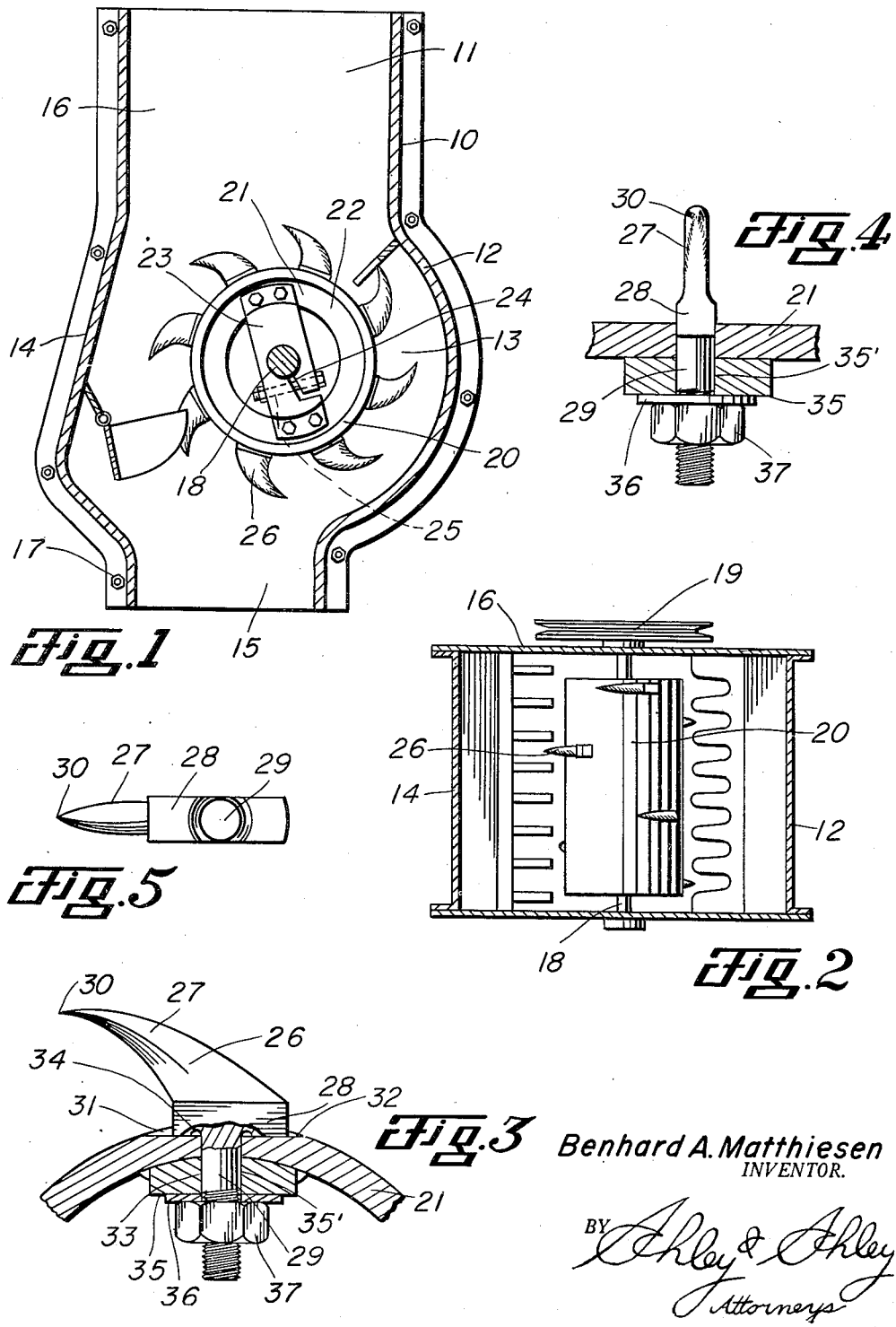

TOOTHED ICE-CRUSHER DRUM

Benhard A. Matthiesen, San Antonio, Tex.

Application December 15, 1949, Serial No. 133,093

2 Claims. (Cl. 241—294)

This invention relates to new and useful improvements in toothed ice-crusher drums.

One object of the invention is to provide an improved ice crusher drum having teeth secured thereto in a new and novel manner so as to resist breaking off.

Another object of the invention is to provide a drum of the character described, having a plurality of teeth, each having a long pointed overhanging horn and an elongate base seated in the drum cylinder so as not to rock or loosen due to the leverage of the long horn.

A further object of the invention is to provide an improved ice-crusher tooth having a base, the bottom of which is flat and is formed with arcuate recesses or grooves on each side of a shank projecting therefrom, whereby the tooth may be more firmly fastened in place.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a vertical sectional view of an ice crusher constructed in accordance with the invention, Fig. 2 is a horizontal cross-sectional view of the same taken above the drum, Fig. 3 is an enlarged transverse sectional view of a portion of the drum and one of the teeth, Fig. 4 is a vertical sectional view at right angles to Fig. 3, and, Fig. 5 is an underside view of one of the teeth.

In the drawings the numeral 10 designates an upright housing having a throat or hopper 11 at its upper portion, open at its top. The housing is rectangular in cross-section and has a curved bay 12 at its medial portion forming one wall of a crushing chamber 13. The opposite wall 14 of the chamber is offset outwardly. Both of the walls 12 and 14 merge into a short, open mouth or spout 15 at the bottom of the housing. The housing has flat vertical side walls 16 and the walls 12 and 14 are flanged and secured to the inner faces of the side walls by bolts 17.

A transverse shaft 18 extends across the chamber 13 and its ends are suitably journaled in the side walls; one end of said shaft projecting and having a pulley fastened thereon. A hollow drum 20 is fastened on the shaft in the chamber 13. This drum includes an open ended cylinder 21 having internal rings 22 near each end and each ring has a diametrical crosshead 23 secured thereto. Each crosshead is bored to receive the shaft and is also split at 24, so as to be tightened on the shaft by a transverse bolt 25.

The important feature of the invention resides in a tooth 26, of which a plurality are used. These teeth are mounted on the drum in staggered relation and in circumferential rows, as is common in this art. Each tooth includes a curved overhanging horn 27, a rectangular base 28 and a shank 29. Since the drum is revolved in a counterclockwise direction the horn overhangs on the left hand side (Figs. 1 and 3) or in the direction of revolution. Each horn, while relatively thin and approximately flat on each side, is reduced to a comparatively long, sharp point 30. This enables the horn to effectively hook into the ice and break it, rather than merely ploughing through it.

Another feature of the invention is the mounting of the tooth. The base 28 is elongated, coextensively with the sides of the horn which gives said base length in the direction of travel or transversely of the drum, but makes it comparatively narrow longitudinally of the drum. For each tooth, the outer surface of the drum cylinder 21 is formed with a circumferential seat or sump 31 having a flat bottom 32. The seat is just wide enough to snugly receive the sides of the base.

It will be observed that the seat 31 is deep enough to receive a substantial portion of the base 28. It is essential that the flat bottom of the base rest firmly on the flat bottom 32 of the seat. The shank 29 extends snugly through an aperture 33 at the center of the seat. The shank has a diameter substantially equal to the width of the base. Arcuate recesses or grooves 34 are formed in the flat bottom of the base on each side of the shank and contiguous thereto and provide clearance around the outer edge of the aperture. These grooves assure a firm engagement of the bottom of the base 28 on the bottom 32 of the seat when the shank is fastened.

For each shank, a reinforcement or block 35 is welded to the inner side of the cylinder 21 and has a hole 35' alined with the aperture 33. The inner end of the shank is screw-threaded to receive a nut 37 and a flat washer 36 is confined between the block and the nut. The nut is tightened with considerable force so as to draw the shank in and firmly seat the base on the bottom 32. The grooves 34 assure firm seating. Much trouble has been had in ice crushers due to the breaking of teeth from the drum.

Unless there is firm seating the rocking thrust imparted to the point 30, will cause a complementary movement at the base. Owing to the leverage, a minute play or looseness at the base will set up stresses and strains resulting in wear and breakage, unless the foregoing means is used. The block 35 is quite important because owing to the depth of the seat 31, the cylinder wall is so reduced in thickness that it would not present sufficient body to adequately support the tooth. Teeth supported only by the thickness of the cylinder wall frequently pull out. The grooves 34 are deep enough and so close to the shank as to substantially extend said shank inwardly beyond the flat bottom surface of the base.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An ice crusher drum including, a hollow drum having a cylindrical outer surface provided with a plurality of transverse seats, each seat having a flat bottom and extending at its ends into the outer cylindrical surface of the drum, each seat being long transversely of the drum and narrow longitudinally of said drum and having upright flat side walls, teeth each having a point and an elongate flat bottomed base provided with flat upright side walls snugly engaging in one of the seats with its flat bottom in intimate contact with flat bottom of the seat and its flat side walls in intimate contact with the flat side walls of the seat, whereby each tooth has elongate bearings in its seat along each side transversely of the drum and is held against lateral displacement throughout the length of its base, a fastening member extending from the base through the wall of the drum having a fastening securing the base in its seat, each tooth being gradually reduced from its base to its point and having its bottom defined by the base with its top side continuously curved from the rear end of the base to its point and its underside curved abruptly and continuously from the front end of said base to its point, whereby each tooth tends to dig downwardly into lumps of ice and more efficiently crush the latter.

2. An ice crusher drum including, a hollow drum having a cylindrical outer surface provided with a plurality of transverse seats, each seat having a flat bottom and extending at its ends into the outer cylindrical surface of the drum, each seat being long transversely of the drum and narrow longitudinally of said drum and having upright flat side walls, teeth each having a point and an elongate flat bottomed base provided with flat upright side walls snugly engaging in one of the seats with its flat bottom in intimate contact with flat bottom of the seat and its flat side walls in intimate contact with the flat side walls of the seat, whereby each tooth has elongate bearings in its seat along each side transversely of the drum and is held against lateral displacement throughout the length of its base, a shank extending medially from the bottom of each tooth base through the bottom of each seat, blocks bearing against the inner surface of drum opposite the seats and having holes penetrated by the shanks, each block being substantially as long as its correlated tooth base and coacting therewith to prevent rocking of the tooth circumferentially of the drum, and a nut on each shank fastening the tooth and block in place.

BENHARD A. MATTHIESEN.

REFERENCES CITED

The following references are of record in the file of this patent:

UNITED STATES PATENTS

| Number | Name | Date |
|---|---|---|
| 308,136 | Christian | Nov. 18, 1884 |
| 335,387 | Roberts | Feb. 2, 1886 |
| 342,289 | Dunbar | May 18, 1886 |
| 432,758 | Mills | July 22, 1890 |
| 472,131 | Macomber | Apr. 5, 1892 |
| 542,075 | Brown | July 2, 1895 |
| 918,857 | Jacobson et al. | Apr. 20, 1909 |
| 1,190,329 | Schmidt | July 11, 1916 |

OTHER REFERENCES

Machinery's Handbook, 14th edition, published by the Industrial Press, New York city, N. Y.